US008831991B2

(12) United States Patent
Allen et al.

(10) Patent No.: US 8,831,991 B2
(45) Date of Patent: Sep. 9, 2014

(54) LIMITED-LIFE ELECTRONIC MAIL ACCOUNT AS INTERMEDIARY

(75) Inventors: Paul G. Allen, Seattle, WA (US);
Edward K.Y. Jung, Bellevue, WA (US);
Royce A. Levien, Lexington, MA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 580 days.

(21) Appl. No.: 11/041,894

(22) Filed: Jan. 21, 2005

(65) Prior Publication Data

US 2006/0167800 A1    Jul. 27, 2006

(51) Int. Cl.
*G06F 21/00*    (2013.01)

(52) U.S. Cl.
USPC .......................................................... 705/50

(58) Field of Classification Search
USPC .............. 705/50, 16, 21, 59, 71; 380/44, 262, 380/278, 279
See application file for complete search history.

(56) References Cited

U.S. PATENT DOCUMENTS

| | | | |
|---|---|---|---|
| 5,375,240 A | 12/1994 | Grundy | |
| 5,799,067 A | 8/1998 | Kikinis et al. | |
| 6,014,502 A | 1/2000 | Moraes | |
| 6,161,139 A | 12/2000 | Win et al. | |
| 6,219,786 B1 | 4/2001 | Cunningham et al. | |
| 6,272,636 B1 * | 8/2001 | Neville et al. | 713/189 |
| 6,324,569 B1 | 11/2001 | Ogilvie et al. | |
| 6,359,711 B1 | 3/2002 | Cole et al. | |
| 6,473,758 B1 | 10/2002 | Schwartz et al. | |
| 6,474,547 B1 | 11/2002 | Suzuki | |
| 6,484,197 B1 * | 11/2002 | Donohue | 709/206 |
| 6,487,586 B2 | 11/2002 | Ogilvie et al. | |
| 6,643,688 B1 | 11/2003 | Fuisz | |
| 6,701,347 B1 | 3/2004 | Ogilvie | |
| 6,711,608 B1 | 3/2004 | Ogilvie | |
| 6,732,101 B1 * | 5/2004 | Cook | 1/1 |
| 6,757,713 B1 | 6/2004 | Ogilvie et al. | |
| 7,016,877 B1 | 3/2006 | Steele et al. | |
| 7,076,533 B1 | 7/2006 | Knox et al. | |
| 7,082,439 B1 | 7/2006 | Hickman et al. | |
| 7,171,562 B2 | 1/2007 | Brown et al. | |
| 7,228,357 B2 | 6/2007 | Plewnia | |
| 7,278,983 B2 | 10/2007 | Ireland et al. | |
| 7,356,564 B2 | 4/2008 | Hartselle et al. | |
| 7,447,756 B2 | 11/2008 | Malik | |
| 7,469,280 B2 | 12/2008 | Simpson | |
| 7,536,438 B2 | 5/2009 | Suzuki et al. | |
| 7,590,697 B2 * | 9/2009 | Ito et al. | 709/206 |
| 7,627,652 B1 | 12/2009 | Commons et al. | |

(Continued)

OTHER PUBLICATIONS

U.S. Appl. No. 11/111,488, Jung et al.

(Continued)

*Primary Examiner* — Dante Ravetti (57) ABSTRACT

In one aspect, a method includes but is not limited to detecting that a limited-use electronic mail account user has accessed a limited-use electronic mail account; accepting an input commanding the disposition of the item of electronic mail received by the limited-use electronic mail account; and disabling further use of the limited-use electronic mail account. In addition to the foregoing, other method and system aspects are described in the claims, drawings, and text forming a part of the present application.

9 Claims, 7 Drawing Sheets

(56) References Cited

U.S. PATENT DOCUMENTS

| | | |
|---|---|---|
| 8,234,339 B2 | 7/2012 | Adams et al. |
| 8,370,437 B2 | 2/2013 | Duffek et al. |
| 2001/0034720 A1 | 10/2001 | Armes |
| 2002/0016735 A1 | 2/2002 | Runge et al. |
| 2002/0023135 A1 | 2/2002 | Shuster |
| 2002/0069253 A1 | 6/2002 | Kazui et al. |
| 2002/0087641 A1 | 7/2002 | Levosky |
| 2002/0120564 A1* | 8/2002 | Strietzel ............... 705/40 |
| 2002/0138581 A1 | 9/2002 | MacIntosh et al. |
| 2002/0156848 A1 | 10/2002 | Grouse |
| 2002/0173308 A1 | 11/2002 | Dorenbosch et al. |
| 2003/0065713 A1* | 4/2003 | Quach et al. ........... 709/203 |
| 2003/0069934 A1 | 4/2003 | Garcia-Martin et al. |
| 2003/0074412 A1 | 4/2003 | Muto |
| 2003/0088786 A1 | 5/2003 | Moran et al. |
| 2003/0090572 A1* | 5/2003 | Belz et al. ............ 348/207.1 |
| 2003/0140103 A1 | 7/2003 | Szeto et al. |
| 2003/0177248 A1 | 9/2003 | Brown et al. |
| 2003/0195842 A1 | 10/2003 | Reece |
| 2003/0220976 A1 | 11/2003 | Malik |
| 2003/0233415 A1* | 12/2003 | Beyda ............... 709/206 |
| 2004/0049696 A1 | 3/2004 | Baker et al. |
| 2004/0068440 A1 | 4/2004 | Porato |
| 2004/0078325 A1 | 4/2004 | O'Connor |
| 2004/0128512 A1* | 7/2004 | Sharma et al. ............ 713/176 |
| 2004/0158532 A1 | 8/2004 | Breck et al. |
| 2004/0210448 A1 | 10/2004 | Breck et al. |
| 2004/0210449 A1 | 10/2004 | Breck et al. |
| 2004/0230657 A1* | 11/2004 | Tomkow ............... 709/206 |
| 2004/0243679 A1 | 12/2004 | Tyler |
| 2004/0243844 A1 | 12/2004 | Adkins |
| 2004/0254996 A1* | 12/2004 | Yabe et al. ............ 709/206 |
| 2005/0015448 A1 | 1/2005 | Smith et al. |
| 2005/0038687 A1 | 2/2005 | Galdes |
| 2005/0050324 A1 | 3/2005 | Corbett et al. |
| 2005/0136988 A1 | 6/2005 | Villamil et al. |
| 2005/0144244 A1 | 6/2005 | Landesmann |
| 2005/0206549 A1 | 9/2005 | Stefanik |
| 2005/0228723 A1 | 10/2005 | Malik |
| 2006/0031319 A1 | 2/2006 | Nelson et al. |
| 2006/0085505 A1 | 4/2006 | Gillum et al. |
| 2006/0106914 A1* | 5/2006 | Plow et al. ............ 709/206 |
| 2006/0112165 A9 | 5/2006 | Tomkow et al. |
| 2006/0141981 A1 | 6/2006 | Lin |
| 2006/0168046 A1 | 7/2006 | Qureshi |
| 2007/0078677 A1 | 4/2007 | Hofstetter |
| 2007/0117538 A1 | 5/2007 | Weiser et al. |
| 2007/0180039 A1 | 8/2007 | Sutidze et al. |

OTHER PUBLICATIONS

U.S. Appl. No. 11/107,343, Jung et al.
U.S. Appl. No. 11/087,727, Jung et al.
U.S. Appl. No. 11/066,728, Allen et al.
U.S. Appl. No. 11/046,224, Allen et al.
PCT International Search Report; International App. No. PCT/US06/01657; Sep. 18, 2006.
PCT International Search Report; International App. No. PCT/US06/02273; Jul. 18, 2008; pp. 1-2.
"Visa Account Information Security"; Visa Public; Mar. 1, 2000; 48 pp.; Version 1.4; Visa International.
"GuerrillaMail—Disposable Temporary E-Mail Address"; guerrillamail.com; created on Feb. 26, 2014; 4 pages.
"Tor Project: Anonymity Online"; Tor Project; created on Feb. 26, 2014; 4 pages; located at https://www.torproject.org/index.html.en.
Wolff, Josephine; "C+ in Online Anonymity"; slate.com; Dec. 18, 2013; 4 pages; located at http://www.slate.com/articles/technology/future_tense/2013/12/harvard_exam_bomb_threads_how_the_alleged_hoaxer_failed_to_cover_his_online.html; The Slate Group, LLC.

* cited by examiner

LIMITED-LIFE ELECTRONIC MAIL ACCOUNT AS INTERMEDIARY

TECHNICAL FIELD

The present application relates, in general, to privacy preservation in the use of electronic mail.

SUMMARY

In one aspect, a method includes but is not limited to detecting that a limited-use electronic mail account user has accessed a limited-use electronic mail account; accepting an input commanding a disposition of an item of electronic mail received by the limited-use electronic mail account; and disabling further use of the limited-use electronic mail account. In addition to the foregoing, other method aspects are described in the claims, drawings, and text forming a part of the present application.

In another aspect, a system includes but is not limited to a processor; a memory operably coupled to the processor; circuitry operably coupled to the processor and to the memory for detecting that a limited-use electronic mail account user has accessed a limited-use electronic mail account; circuitry operably coupled to the processor and to the memory for accepting an input commanding a disposition of an item of electronic mail received by the limited-use electronic mail account; and circuitry operably coupled to the processor and to the memory for disabling further use of the limited-use electronic mail account. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In another aspect, a program product includes but is not limited to one or more instructions configurable to detect that a limited-use electronic mail account user has accessed a limited-use electronic mail account; one or more instructions configurable to accept an input commanding a disposition of an item of electronic mail received by the limited-use electronic mail account; one or more instructions configurable to disable further use of the limited-use electronic mail account; and a signal bearing medium bearing the one or more instructions configurable to detect that a limited-use electronic mail account user has accessed a limited-use electronic mail account, one or more instructions configurable to accept an input commanding a disposition of the item of electronic mail received by the limited-use electronic mail account, and one or more instructions configurable to disable further use of the limited-use electronic mail account. In addition to the foregoing, other program product aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

BRIEF DESCRIPTION OF THE FIGURES

The use of the same symbols in different drawings typically indicates similar or identical items.

DETAILED DESCRIPTION

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 1:
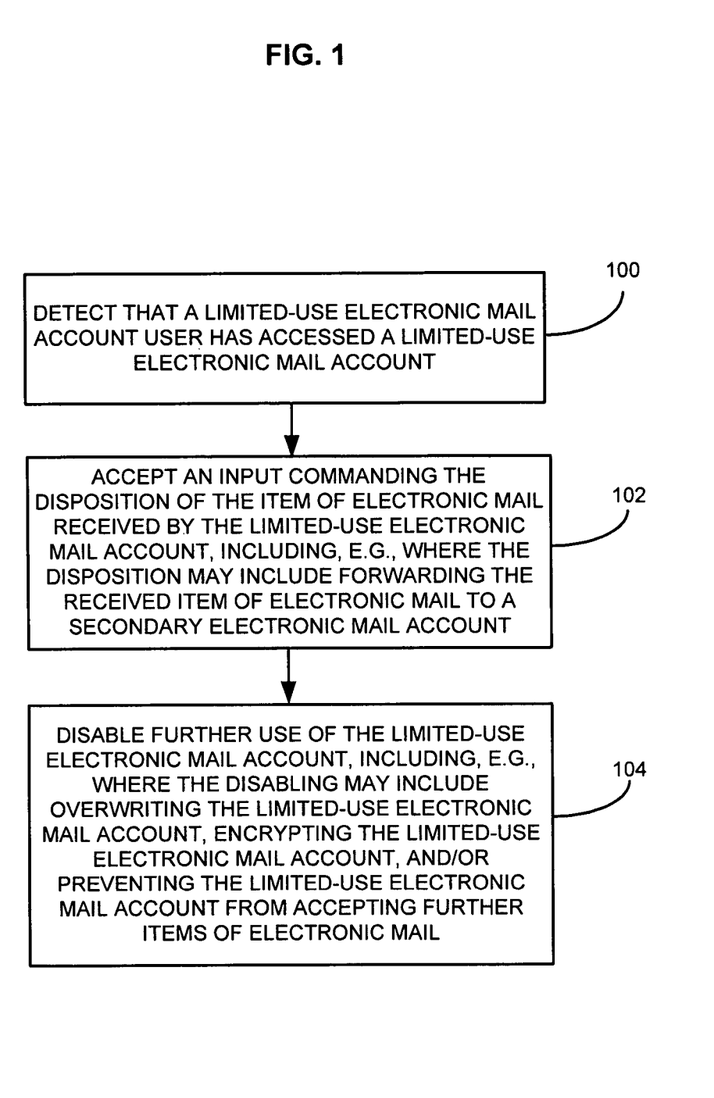
FIG. 1 is a flow chart depicting an aspect of the subject matter of the present application.

With reference now to FIG. 1, depicted is a method of privacy preservation that includes detecting that a limited-use electronic mail account user has accessed a limited-use electronic mail account (step 100); accepting an input commanding the disposition of the item of electronic mail received by the limited-use electronic mail account (step 102); and disabling further use of the limited-use electronic mail account (step 104). The disposition of step 102 may include, e.g., forwarding the received item of electronic mail to a secondary electronic mail account. The disabling of step 104 may include, e.g., overwriting the limited-use electronic mail account, encrypting the limited-use electronic mail account, and/or preventing the limited-use electronic mail account from accepting further items of electronic mail.

Figure 2:
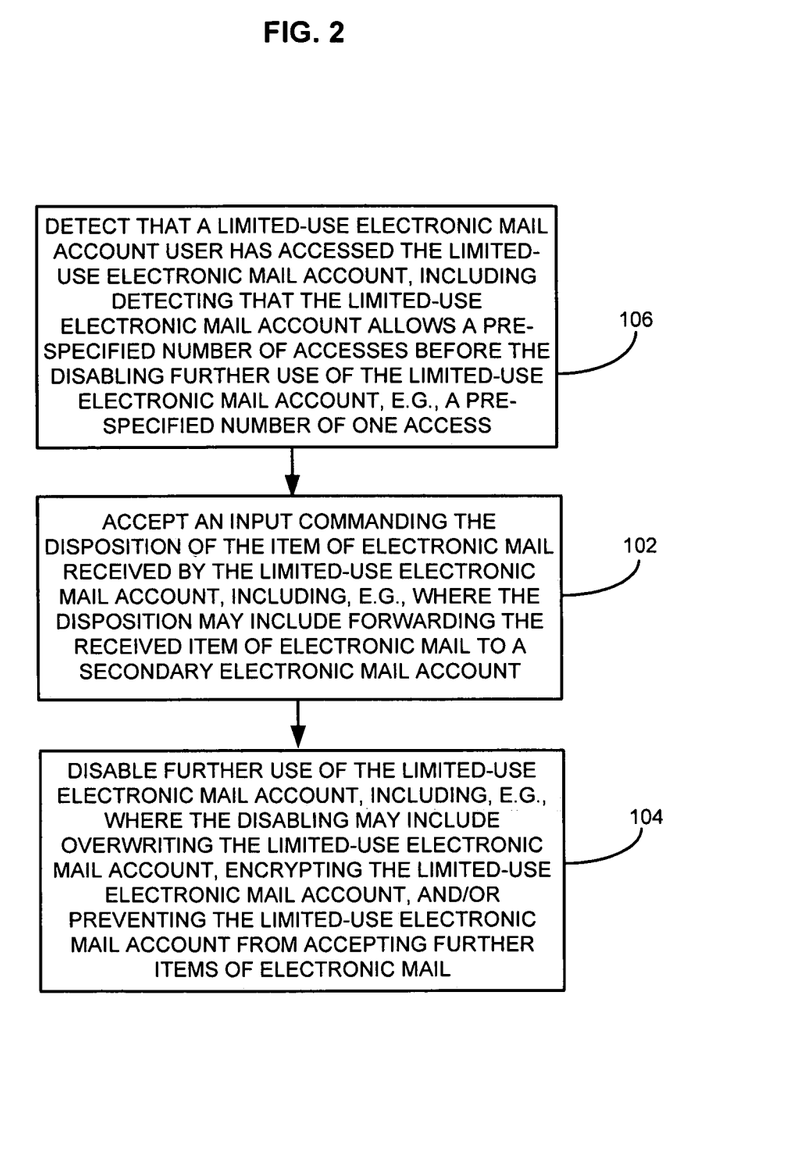
FIG. 2 is a flow chart depicting another aspect of the subject matter of the present application.

FIG. 2 illustrates another aspect, a method of privacy preservation that includes steps 102 and 104, and, in addition, detecting that the limited-use electronic mail account user has accessed the limited-use electronic mail account, including detecting that the limited-use electronic mail account allows a pre-specified number of accesses before the disabling further use of the limited-use electronic mail account, e.g., a pre-specified number of one access (step 106).

Figure 3:
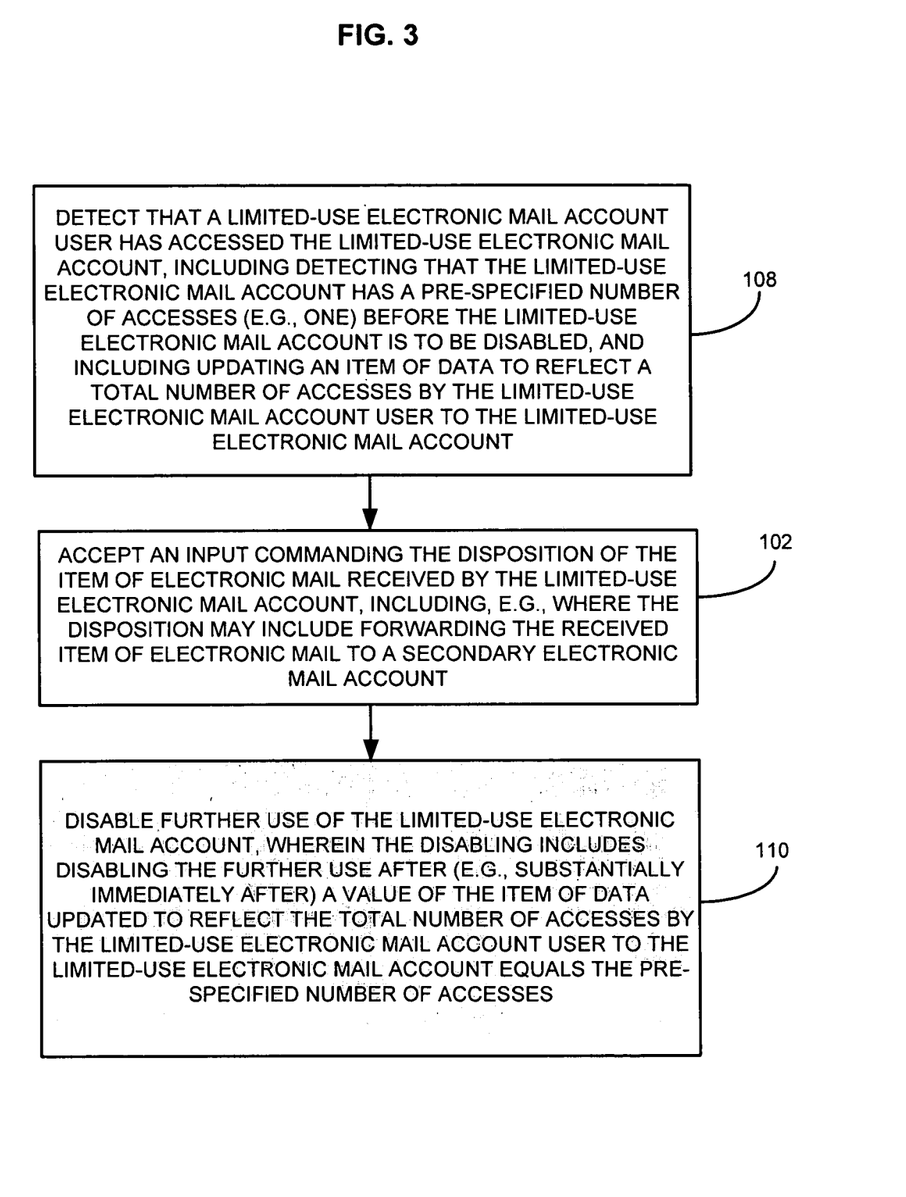
FIG. 3 is a flow chart depicting an aspect.

FIG. 3 shows another aspect, a method of privacy preservation that includes step 102, and, in addition, detecting that a limited-use electronic mail account user has accessed the limited-use electronic mail account, including detecting that the limited-use electronic mail account has a pre-specified number of accesses (e.g., one) before the limited-use electronic mail account is to be disabled, and including updating an item of data to reflect a total number of accesses by the limited-use electronic mail account user to the limited-use electronic mail account (step 108); and disabling further use of the limited-use electronic mail account, wherein the disabling includes disabling the further use after (e.g., substantially immediately after) a value of the item of data updated to reflect the total number of accesses by the limited-use electronic mail account user to the limited-use electronic mail account equals the pre-specified number of accesses (step 110).

Figure 4:
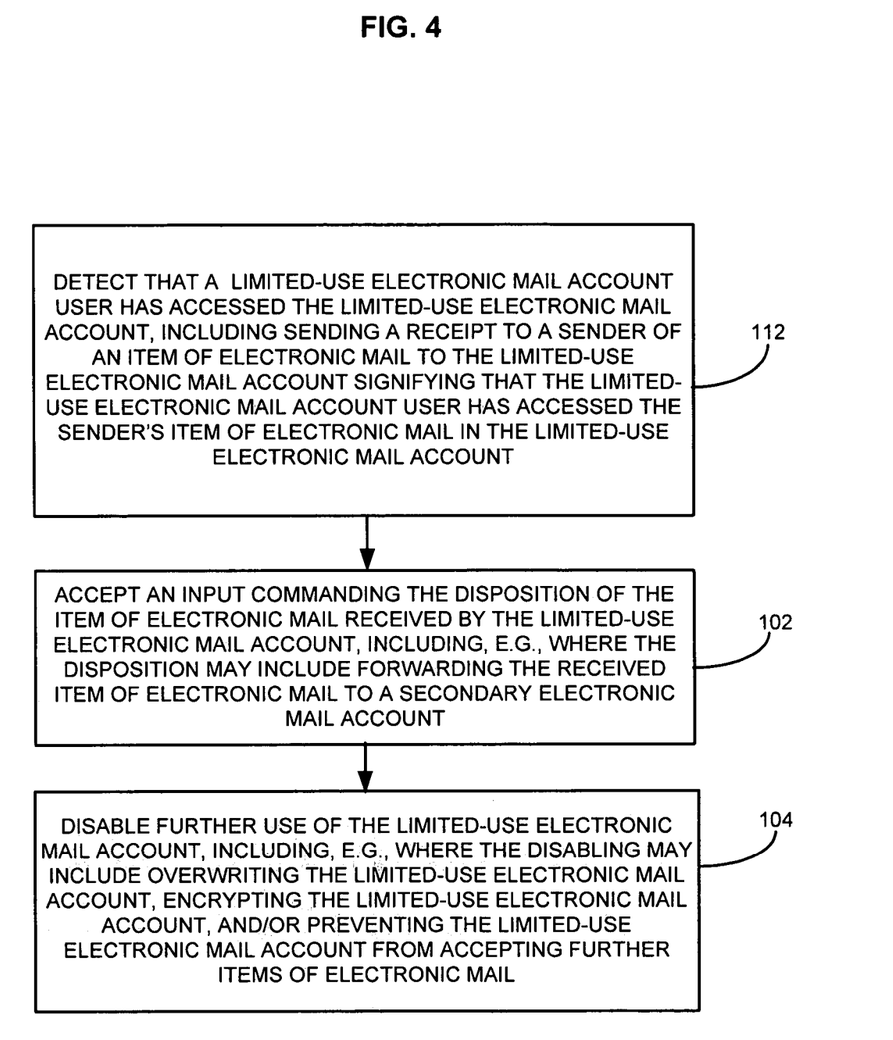
FIG. 4 is a flow chart depicting an aspect.

FIG. 4 depicts another aspect, a method of privacy preservation that includes detecting that a limited-use electronic mail account user has accessed the limited-use electronic mail account, including sending a receipt to a sender of an item of electronic mail to the limited-use electronic mail account signifying that the limited-use electronic mail account user has accessed the sender's item of electronic mail in the limited-use electronic mail account (step 112), in addition to steps 102 and 104.

Figure 5:
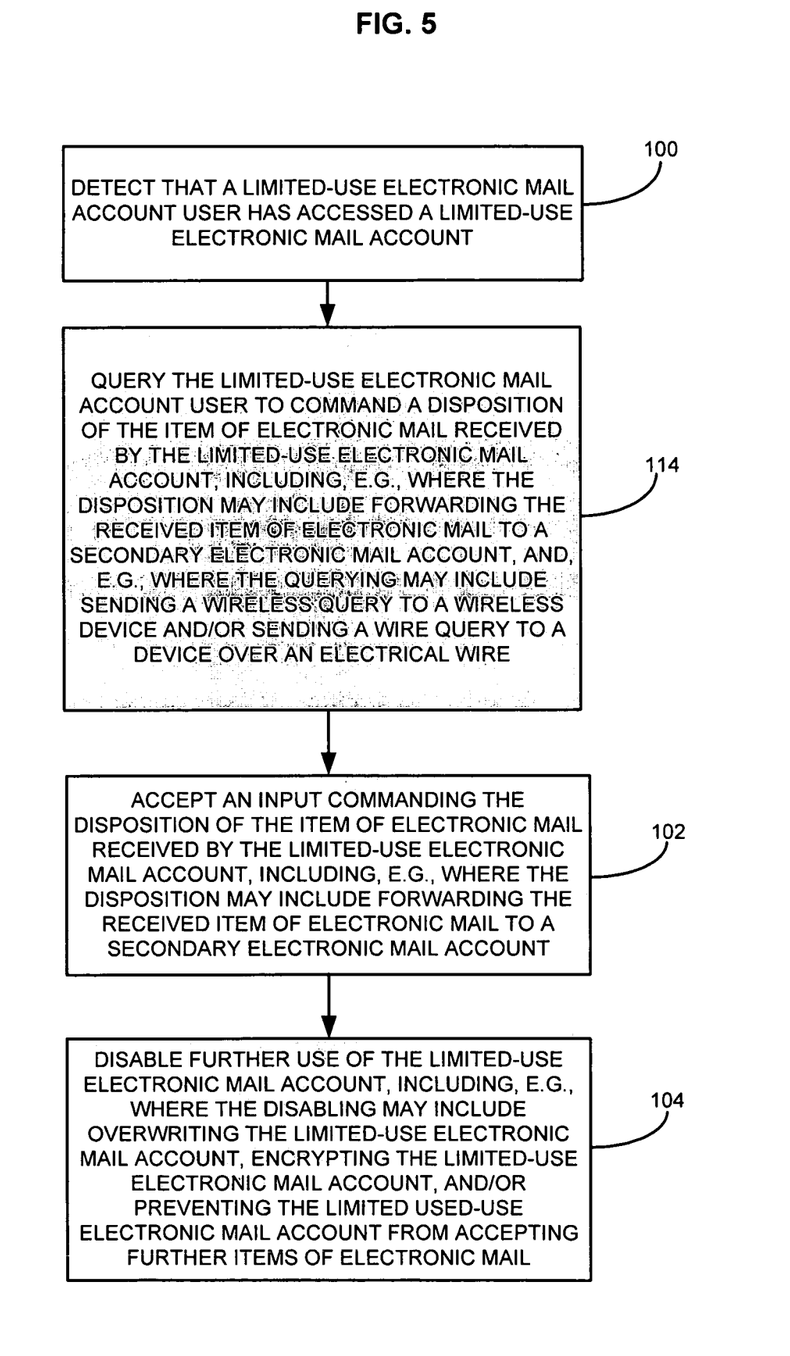
FIG. 5 is a flow chart depicting an aspect.

FIG. 5 illustrates a method of privacy preservation that includes steps 100, 102 and 104, and, in addition, querying the limited-use electronic mail account user to command the disposition of the item of electronic mail received by the limited-use electronic mail account (step 114). The disposition of step 114 may include, e.g., forwarding the received item of electronic mail to a secondary electronic mail account. The querying of step 114 may include, e.g., sending a wireless query to a wireless device and/or sending a wire query to a device over an electrical wire.

Figure 6:
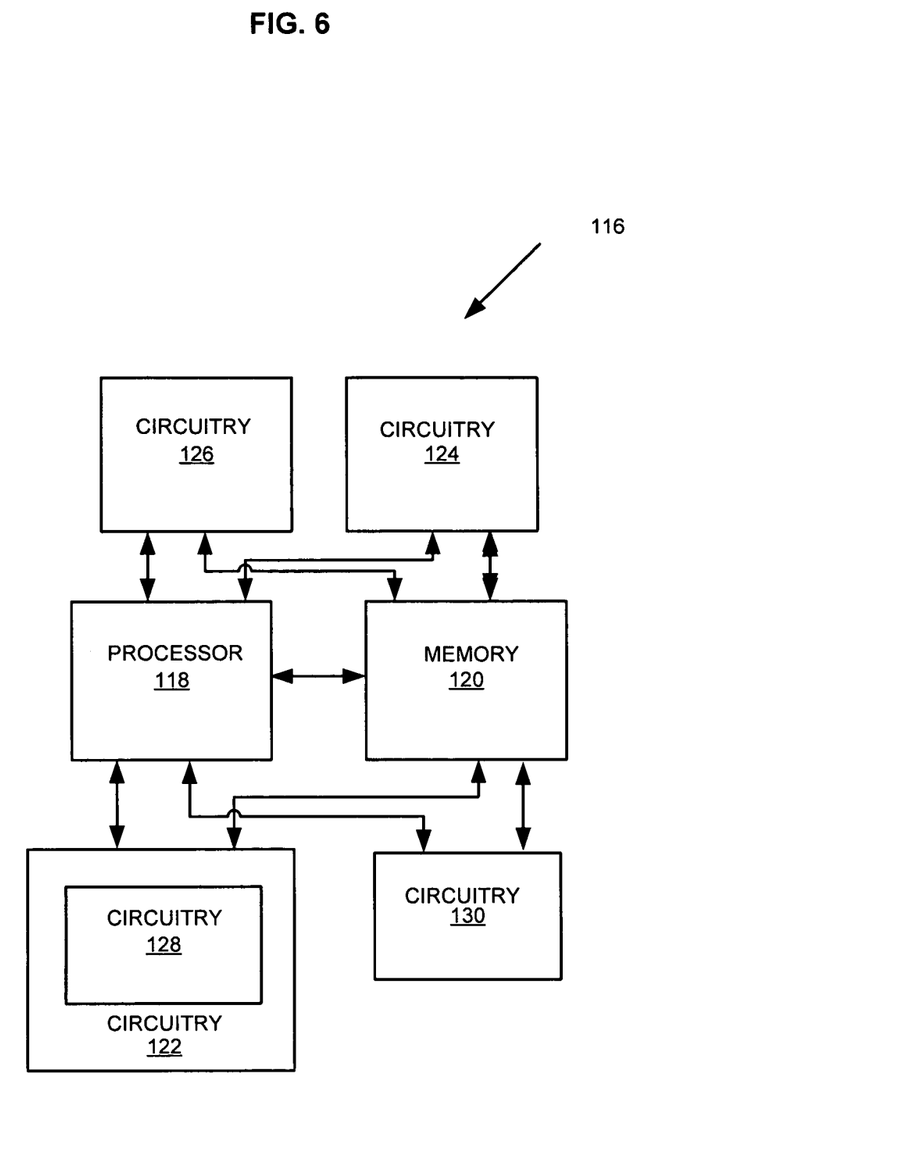
FIG. 6 is a block diagram of another aspect.

FIG. 6 shows a system 116 that includes a processor 118; a memory 120 operably coupled to the processor 118; circuitry 122 operably coupled to the processor 118 and to the memory 120 for detecting that a limited-use electronic mail account user has accessed the limited-use electronic mail account; circuitry 124 operably coupled to the processor 118 and to the memory 120 for accepting an input commanding a disposition of an item of electronic mail received by the limited-use electronic mail account; and circuitry 126 operably coupled to the processor 118 and to the memory 120 for disabling further use of the limited-use electronic mail account. The circuitry 122 may include circuitry 128 operably coupled to the processor and to the memory for detecting that the limited-use electronic mail account has a pre-specified number of accesses (e.g., one) before the limited-use electronic mail account is to be disabled. The detecting performed by the circuitry 126 may include updating an item of data reflecting the total number of accesses by the limited-use electronic mail account user to the limited-use electronic mail account. The disabling performed by the circuitry 126 may occur substantially immediately after the item of data reflecting the total number of accesses by the limited-use electronic mail account user to the limited-use electronic mail account is updated and then equals the pre-specified number of accesses. The system 116 may include circuitry 130 operably coupled to the processor and to the memory for querying the limited-use electronic mail account user to command the disposition of the item of electronic mail received by the limited-use electronic mail account.

Figure 7:
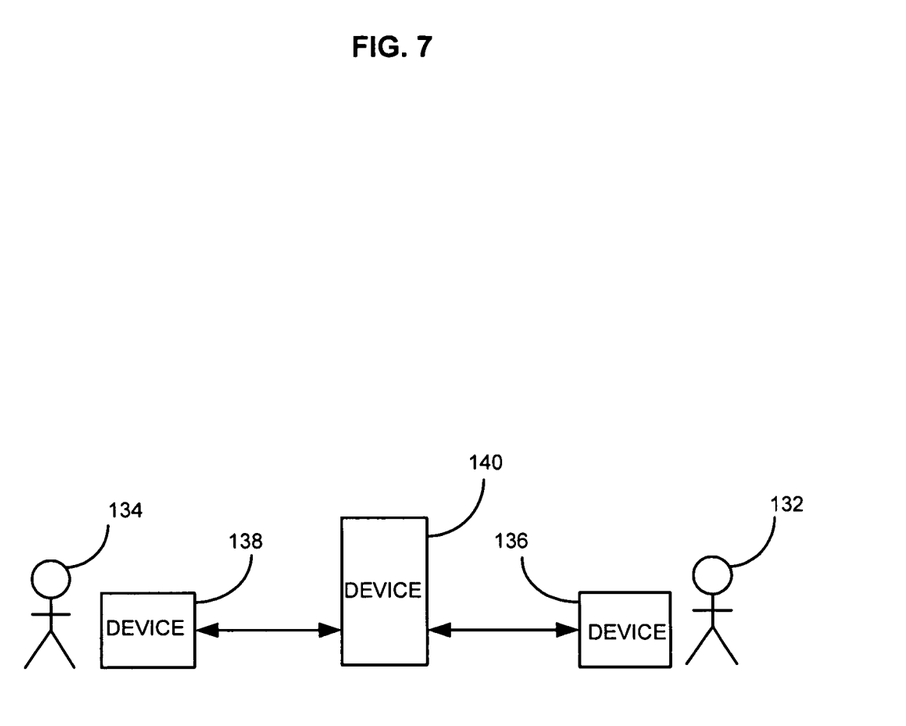
FIG. 7 depicts an exemplary environment in which the methods and systems described herein may be represented.

FIG. 7 depicts an exemplary environment in which the methods and systems described herein may be represented. The sender 132 is the sender of an item of electronic mail to the limited-use electronic mail account user 134. The sender uses device 136, which may be a wireless handheld device, a laptop computer, a personal computer, a desk computer, a computer system terminal, or any other device capable of providing an interface between the sender 132 and an electronic mail account from which an item of electronic mail may be sent. The mail account user uses a device 138, which may be a wireless handheld device, a laptop computer, a personal computer, a desk computer, a computer system terminal, or any other device capable of providing an interface between the mail account user 134 and an electronic mail account that may receive the item of electronic mail sent by the sender 132. Device 140 is exemplary of any and all intermediate devices that may provide paths and/or computational resources, e.g., one or more electronic mail server and/or transmission media, to carry the item of electronic mail from the sender 132 to the limited-use electronic mail account user 134.

Each of steps 100, 102, 104, 106, 108, 110, 112 and 114 as described above may be performed, e.g., with system 116 as described above. Additionally, each of steps 100, 102, 104, 106, 108, 110, 112 and 114 as described above may be performed using the devices 136, 138 and 140 of FIG. 7. For example, step 100 may be performed using the device 136, and/or the device, 138, and/or the device 140 in various combinations and permutations thereof within the ambit of skilled in the art). Additionally, each of steps 100, 102, 104, 106, 108, 110, 112 and 114 as described above may be performed using the devices 136, 138 and 140 of FIG. 7. For example, step 100 may be performed using the device 136, and/or the device, 138, and/or the device 140 in various combinations and permutations thereof within the ambit of skilled in the art.

One skilled in the art will recognize that the foregoing components (e.g., steps), devices, and objects in FIGS. 1-7 and the discussion accompanying them are used as examples for the sake of conceptual clarity and that various configuration modifications are common. Consequently, as used herein, the specific exemplars set forth in FIGS. 1-7 and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote computing/communication systems, combined with standard engineering practices. Specific examples of such components entail such as Intel Corporation's mote components and supporting hardware, software, and firmware as well as the Defense Advanced Research Project Agency's (DARPA's) network embedded sensor technologies.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Other embodiments are within the following claims.

We claim:

1. A method comprising:
   determining, by using one or more processing components, that a limited-use electronic mail account has received at least one item of electronic mail;
   forwarding, by using one or more processing components, the at least one item of electronic mail from the limited-use electronic mail account to at least one secondary electronic mail account in accordance with at least one disposition command;
   setting, by using one or more processing components, a pre-specified value corresponding to a minimum number of accesses to the limited-use electronic mail account in which the limited-use electronic mail account will be disabled;
   determining, by the one or more processing components, a number of accesses to the limited-use electronic mail account reached or exceeded the pre-specified value, the determining a) based on the forwarding of the at least one item of electronic mail from the limited-use electronic mail account to at least one secondary electronic mail account or b) based on accesses to the limited-use electronic mail account;

based on the determining that the number of accesses to the limited-use electronic mail account reached or exceeded the pre-specified value, disabling the limited-use electronic mail account; and implementing at least partially using at least one of hardware or firmware at least one of the a) determining that the limited-use electronic mail account has received at least one item of electronic mail, b) forwarding the at least one item of electronic mail, c) setting the pre-specified value, d) determining the number of accesses to the limited-use electronic mail account reached or exceeded the pre-specified value, or e) disabling the limited-use electronic mail account.

2. The method of claim 1, further comprising:
detecting that a user has accessed the limited-use electronic mail account.

3. The method of claim 1, further comprising:
detecting that a user has accessed the limited-use electronic mail account one time.

4. The method of claim 1, further comprising:
detecting that a user has accessed the limited-use electronic mail account multiple times; and
updating an item of data to indicate the number of times that the user has accessed the limited-use electronic mail account.

5. The method of claim 1, further comprising:
disabling the limited-use electronic mail account based on the determining by the one or more processing components that a user accessed the limited-use electronic mail account the pre-specified number of times greater than 1.

6. The method of claim 1, further comprising:
sending at least one receipt to at least one sender of the at least one item of electronic mail.

7. The method of claim 1, wherein the disabling the limited-use electronic mail account based on the number of accesses to the limited-use electronic mail account reaching or exceeding the pre-specified value comprises:

encrypting the limited-use electronic mail account in response to the number of accesses to the limited-use electronic mail account reaching or exceeding the pre-specified value.

8. The method of claim 1, wherein the disabling the limited-use electronic mail based on the number of accesses to the limited-use electronic mail account reaching or exceeding the pre-specified value comprises:

preventing receipt of one or more additional items of electronic mail by the limited-use electronic mail account based on the determining of the number of accesses to the limited-use electronic mail account a) based, at least partially, on the forwarding the at least one item of electronic mail from the limited-use electronic mail account to at least one secondary electronic mail account or b) based, at least partially, on accesses to the limited-use electronic mail account.

9. One or more non-transitory computer readable media comprising one or more stored instructions, when executed by a processor, causes the processor to perform the steps of:

determining that a limited-use electronic mail account has received at least one item of electronic mail;

forwarding the at least one item of electronic mail from the limited-use electronic mail account to at least one secondary electronic mail account in accordance with at least one disposition command;

setting a pre-specified value corresponding to a minimum number of accesses to the limited-use electronic mail account in which the limited-use electronic mail account will be disabled;

determining a number of accesses to the limited-use electronic mail account reached or exceeded the pre-specified value, the determining a) based on the forwarding of the at least one item of electronic mail from the limited-use electronic mail account to at least one secondary electronic mail account or b) based on accesses to the limited-use electronic mail account; and based on the determining that the number of accesses to the limited-use electronic mail account reached or exceeded the pre-specified value, disabling the limited-use electronic mail account.

* * * * *